(12) United States Patent
Pomerleau

(10) Patent No.: US 8,969,260 B2
(45) Date of Patent: Mar. 3, 2015

(54) GLYCEROL BASED DRILLING FLUIDS

(75) Inventor: Daniel Guy Pomerleau, Calgary (CA)

(73) Assignee: HiTech Fluid Systems Ltd. (CA)

( * ) Notice: Subject to any disclaimer, the term of this patent is extended or adjusted under 35 U.S.C. 154(b) by 0 days.

(21) Appl. No.: 13/280,149

(22) Filed: Oct. 24, 2011

(65) Prior Publication Data

US 2012/0040873 A1 Feb. 16, 2012

Related U.S. Application Data

(62) Division of application No. 12/324,478, filed on Nov. 26, 2008, now Pat. No. 8,071,509.

(60) Provisional application No. 60/990,416, filed on Nov. 27, 2007.

(51) Int. Cl.
| | |
|---|---|
| *C09K 8/34* | (2006.01) |
| *C09K 8/36* | (2006.01) |
| *E21B 47/18* | (2012.01) |
| *E21B 47/00* | (2012.01) |
| *C09K 8/12* | (2006.01) |

(52) U.S. Cl.
CPC ............... *C09K 8/12* (2013.01); *C09K 2208/12* (2013.01)
USPC ................ 507/139; 507/120; 175/40; 175/50

(58) Field of Classification Search
USPC .............................. 507/139, 120; 175/40, 50
See application file for complete search history.

(56) References Cited

U.S. PATENT DOCUMENTS

| | | | |
|---|---|---|---|
| 2,191,312 A | 2/1940 | Cannon | |
| 4,508,628 A | 4/1985 | Walker et al. | |
| 4,650,827 A | 3/1987 | Becker et al. | |
| 4,684,479 A | 8/1987 | D'Arrigo | |
| 4,780,220 A | 10/1988 | Peterson | |
| 4,903,769 A | 2/1990 | Hsueh et al. | |
| 5,007,489 A | 4/1991 | Enright et al. | |
| 5,072,794 A | 12/1991 | Hale et al. | |
| 5,076,373 A | 12/1991 | Hale et al. | |
| 5,083,622 A | 1/1992 | Hale et al. | |
| 5,085,282 A | 2/1992 | Hale et al. | |
| 5,099,930 A | 3/1992 | Enright et al. | |
| 5,198,415 A | 3/1993 | Steiger | |
| 5,198,416 A | 3/1993 | Hale et al. | |
| 5,248,664 A | 9/1993 | Hale et al. | |
| 5,248,665 A | 9/1993 | Hale et al. | |
| 5,325,922 A | 7/1994 | Cowan et al. | |
| 5,602,082 A | 2/1997 | Hale et al. | |
| 6,022,833 A | 2/2000 | Mueller et al. | |
| 6,105,691 A | 8/2000 | Hayatdavoudi et al. | |
| 6,156,708 A | 12/2000 | Brookey et al. | |
| 6,435,276 B1 | 8/2002 | Kercheville et al. | |
| 6,662,871 B2 | 12/2003 | Kercheville et al. | |
| 6,825,301 B1 | 11/2004 | Cerf et al. | |
| 6,906,009 B2 | 6/2005 | Shinbach et al. | |
| 6,984,611 B2 | 1/2006 | Kercheville et al. | |
| 7,247,604 B2 | 7/2007 | Dalmazzone et al. | |
| 2006/0029623 A1 | 2/2006 | Astruc et al. | |
| 2006/0073987 A1 | 4/2006 | Mueller et al. | |
| 2006/0272815 A1 | 12/2006 | Jones et al. | |

*Primary Examiner* — Susannah Chung
*Assistant Examiner* — Atnaf Admasu
(74) *Attorney, Agent, or Firm* — St. Onge Steward Johnston & Reens LLC

(57) ABSTRACT

The present invention relates to glycerol based drilling fluids. In particular, the invention relates to drilling fluids comprising a 95-20 volume % glycerol/water solution capable of stabilizing water-sensitive formations during drilling and the use of such solutions for drilling a well having water-sensitive formations.

18 Claims, 8 Drawing Sheets

GLYCEROL BASED DRILLING FLUIDS

CROSS-REFERENCE TO RELATED APPLICATIONS

This application is a division of U.S. patent application Ser. No. 12/324,478, filed Nov. 26, 2008, which application is currently pending and which application claims the benefit under 35 U.S.C. §119(e) of the U.S. Provisional Patent Application Ser. No. 60/990,416, filed on Nov. 27, 2007, the content of which is incorporated herein by reference.

FIELD OF THE INVENTION

The present invention relates to glycerol based drilling fluids. In particular, the invention relates to drilling fluids comprising a 95 to 20 volume % glycerol/water solution capable of stabilizing water-sensitive formations during drilling and the use of such solutions for drilling a well having water-sensitive formations.

BACKGROUND OF THE INVENTION

It is well known to those skilled in the art of drilling fluid design that the exposure to water of some formations or strata penetrated during the excavation of a well may result in an unstable condition in the wellbore. Typically this instability is characterised by sloughing by these water-sensitive formations and sometimes sloughing by formations above and below the water-sensitive strata as well as other factors including mechanically induced instability.

Typically these water-sensitive formations absorb or adsorb water and then expand or "creep" into the wellbore. That is, in this context, creep is understood to be a gradual deformation of the formation which may be considered as similar to the expansion of salt when exposed to water. In the result, creep can result in sticking of the drilling pipes/bit/tools and if it is severe enough, can result in catastrophic wellbore failure.

Many different approaches have been used to attempt to stabilize formations sensitive to water by modification of water-based drilling fluids, by introducing metal halides, polymers, fatty acids soaps, alcohols, asphalts, gilsonite, huminate, surfactants, and other additives to these fluids. Very often, these modifications have minimized the above creep problems and improved the drilling success.

The most successful drilling fluids are typically formulated as water in oil emulsions typically known as invert emulsions or oil-based drilling fluids. In these drilling fluids, water is completely emulsified or dispersed within the continuous oil phase. As is also known, in order to enhance wellbore stability, it is usually the practice to dissolve calcium chloride into the water phase so as to utilize the osmotic force of the dispersed brine phase to balance or pull water from the formation (typically shales or clays) that have been penetrated with the drilling fluid during the drilling process. This dehydration tends to consolidate the formations and reduces or eliminates the possibility of wellbore destabilization due to chemical forces.

Moreover, as is known, these invert emulsion drilling fluids are expensive with typical costs of $1000/m³ for many fluids.

Furthermore, during the well bore excavation process, oil based drilling fluids are "lost" to the borehole due to a number of factors including seepage due to fractures and the porosity of the formation, the hydrostatic pressure of the drilling fluid within the well bore and surface losses as drilling fluid is processed through surface machines such as screening machines, hydrocyclones, and centrifuges. These losses will often account for as much as 75% of the total cost of drilling fluid within a drilling program.

Accordingly, there has been a need to minimize drilling fluid costs, and more specifically, there has been a need for a lower cost drilling fluid which has the same ability to emulsify water as oil based invert drilling fluids. Still further, there has been a need for drilling fluids that are effective in water-sensitive formations such as clays while as known to those skilled in the art, have other desired drilling fluid properties such as being capable of supporting industry standard weighting agents such as barite, barium sulphate, or calcium carbonate as well as an operating temperature range up to 250° F.

SUMMARY OF THE INVENTION

In accordance with the invention, there is provided a drilling fluid solution capable of stabilizing water-sensitive formations comprising a 95:5 to 20:80 volume % glycerol:water solution capable of stabilizing water-sensitive formations during drilling.

In various embodiments, the glycerol:water is 95:5 to 30:70 volume %.

In further embodiments, the drilling fluid may comprise further additives including Group 1 metal salts and/or metal halides. In a preferred embodiment, the Group 1 metal of the Group 1 metal salt has a hydration radius equal to or less than that of potassium and may be approximately 1% by weight of the drilling fluid. In various embodiments, the Group 1 metal salt is selected from potassium chloride, potassium acetate, potassium sulphate, potassium formate, or a combination thereof.

In further embodiments, the drilling fluid includes a dissolved and partially hydrolysed-polyacrylamide (PH-PA) and/or a dissolved and partially hydrolysed-polyacrylonitrile (PH-PAN).

In another aspect of the invention, the invention provides a method of drilling a well having a water-sensitive formation comprising the steps of: a) preparing a drilling solution as described herein; and, b) drilling a well with the drilling solution prepared in step a).

In yet another aspect, the invention describes the use of a drilling solution as described herein for drilling a well having water-sensitive formations.

BRIEF DESCRIPTION OF THE FIGURES

The invention is described with reference to the Figures where.

DETAILED DESCRIPTION

Figure 1:
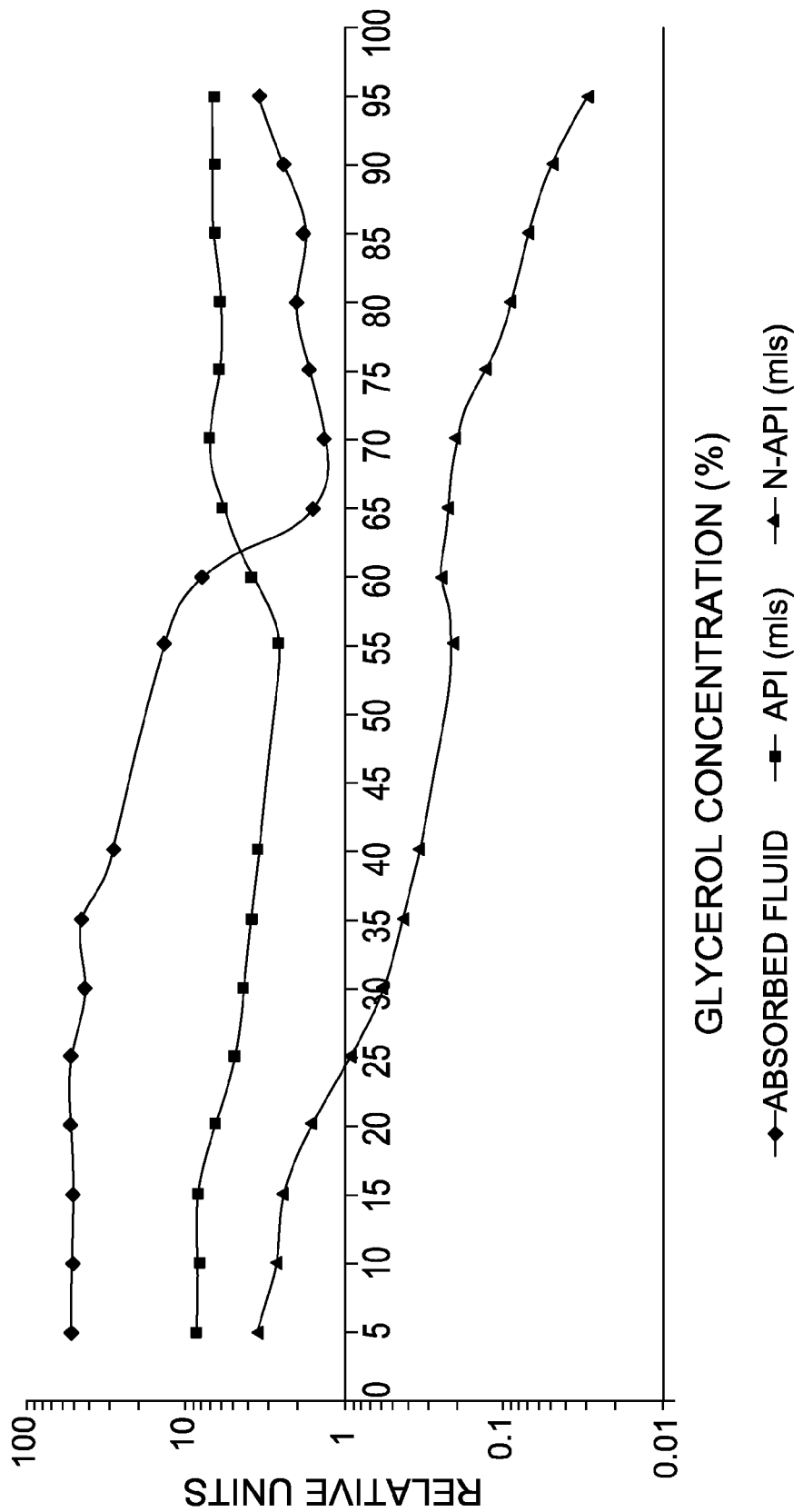
FIG. 1 is a graph showing the effect of glycerol emulsions on clay hydration as measured by API and N-API tests.

In accordance with the invention and with reference to the figures, drilling fluids are described that mitigate the problems described above while providing desired operating properties. In the context of this description, hydration inhibition refers to the ability of a fluid to prevent the hydration of water-sensitive materials such as clays. Drilling fluids of the invention are 95:5 to 20:80 volume % glycerol:water solutions that are capable of stabilizing water-sensitive formations.

The drilling fluids may include various additives as discussed below.

In a preferred embodiment, the drilling fluid will have a halide or Group 1 metal salt (such as KCl) dissolved within the water. The dissolved halide or Group 1 salts improves both the hydration inhibition of the clay by increasing the osmotic pressure between the clay and the drilling fluid as well as allowing for cationic exchange with the clay. In the case of a Group 1 salt, the Group 1 metal has a hydration radius less than or equal to that of potassium.

Glycerol is a natural emulsifier of water and is relatively inexpensive having a cost of approximately $400/m$^3$.

Testing

Glycerol/water solutions were tested for their ability to inhibit hydration of water sensitive minerals such as sodium montmorillonite and sodium bentonite with and without various additives selected from:

(a) Partially hydrolysed-polyacrylamide (PH-PA);
(b) Partially hydrolysed-polyacrylonitrile (PH-PAN);
(c) Metal halides such as $CaCl_2$; and,
(d) Group 1 metal salts such as KCl.

In addition, other known additives can be incorporated to impart known properties such as viscosity, yield point, etc. as known to those skilled in the art. These additives may include:

(a) Xanthum Gum
(b) Polyanionic Cellulose
(c) Carboxymethylcellulose
(d) Water dispersible polymers
(e) Alcohol Ethoxylates
(f) d-Limonene
(g) Terpines
(h) Fatty Acids.

Tests showed that water sensitive clays such as sodium montmorillonite and sodium bentonite did not hydrate when introduced to a glycerol solution containing greater than 20% (by volume) glycerol. In addition, solutions containing 1% (wt %) dissolved metal halides (such as KCl) showed that the metal halides could be dissolved in a water phase emulsified by glycerol.

In addition, tests also showed that viscosifying polymers including polyacrylamide and xanthum gum added to the glycerol solutions were dissolved and produced desired viscosifying properties.

EXPERIMENTAL

Solutions of glycerol (crude glycerine, Cargill) and water were prepared by mixing at various volume % ratios together with various optional additives to determine the effectiveness of the solutions in inhibiting hydration in water sensitive clays. Various testing protocols were implemented that measured the degree of hydration of such clays after contact with the test solutions. These tests included incubating powdered and structural clay samples with the test solution and quantifying the degree of water uptake and changes in the physical properties of the clay samples. In particular, the Mondshine test was utilized in which a structured clay ball was incubated with test drilling solution and hot rolled for 18 hours after which the degree of water uptake by the clay ball was measured and the structure of the clay ball was qualitatively analyzed.

In other words, testing was completed to determine the degree to which water moved into or out of the clay sample during incubation with the test solution.

Test 1

Test solutions containing glycerol, water and polyacrylamide were incubated with bentonite powder. At glycerol/water ratios of 90/10 to 60/40 (by volume) resulted in excellent to good levels of inhibition as measured by the uptake of moisture in the bentonite sample over 24 hours.

Test 2

Test solutions as above with potassium halide (1% by weight) were incubated with bentonite powder and showed reduced levels of hydration in the bentonite sample compared to the test 1 samples. Glycerol water ratios of 90/10, 80/20, and 70/30 were tested.

Test 3

Glycerol was tested as a supplemental additive to a potassium halide and polyacrylamide fluid with the glycerol concentration within the fluid being substantially lower (0-6% by volume).

These results showed that the bentonite sample became more hydrated indicating that lower glycerol concentrations did not inhibit hydration.

Test 4

Glycerol (0 and 10% by volume) was tested with a potassium halide (1% by weight), together with partially hydrolysed polyacylanitrile (ph-pan). The results for a 10% (by volume) glycerol solution showed a 24% reduction in the moisture absorption within the bentonite sample.

Applications:

The use of drilling fluids containing greater than 20% (by volume) glycerol provides advantages in drilling formations containing significant amounts of hydratable dispersible clays and bitumen.

While the use of known oil-based muds inhibits clay swelling and dispersion, many oil based muds have a solvency effect on heavy hydrocarbons (such as bitumen in a SAG-D recovery) which can comprise 30%-100% of the strata being drilled and, as a result, the solvency effect may have a significant negative effect on the formations.

While the use of water-based fluids on such wells prevents bitumen solvency, water-based fluids may result in mud rings and hole enlargement as a result of the hydration of the dispersible and hydratable clays present in the formations. As well, the use of water based fluids also can result in bitumen accretion onto the drilling equipment which creates handling and operational issues. Still further, the use of water-based fluids will also significantly affect disposal costs to the contractor due to the environmental issues relating to the treatment and disposal of drilling fluids containing hydrocarbons.

As a result, as shown by the results, a glycerol based emulsion can be engineered with an inhibitive water phase that will decrease well bore instability due to clay hydration, while at the same time offering a fluid medium into which heavy hydrocarbons (such as bitumen) are not soluble.

Further, a glycerol based fluid acts as an accretion inhibitor, reducing operational and handling issues. The fluid is reusable like an oil-based mud, which adds significantly to its advantages over water based fluids, and the fluid formulation is significantly lower in cost (circa $400 per cubic meter) than an oil mud.

Discussion of Figures

With reference to the Figures, the following parameters were investigated as defined below.

Absorbed Fluid was calculated by weighing a sample of clay exposed to the fluid for 18 hours. The weight of the clay was subtracted from the sample to determine the absorbed value in grams.

API: The clay sample was placed in a pressure vessel at 100 psi for 10 min in contact with a filtering medium and the amount of fluid recovered was recorded as API.

N-API is the API value normalized for the variation in viscosity between samples.

PHPA Test: This test was used to measure the water absorbed by clay exposed to PHPA. In this test, a clay sample was poured onto a fluid surface with the fluid containing PHPA and allowed to sink within the fluid. The clay samples inevitably were cocooned by the PHPA and water was taken up over the period of 18 hours. The cocooned sample was then extracted and weighed and the weight of the clay sample was subtracted from the value to provide an absorbed water weight.

Blow Through: After the API tests, the remaining fluid sample was pressured up to 180 psi from 100 psi and the total time for API and the balance of the fluid in the chamber to completely pass through the paper medium was recorded as blow through. Typical results indicated that the more rapid the blow through the more inhibitive the fluid. In some cases the API time was in excess to that of the blow-through time.

FIG. 1 shows that absorbed fluid tracks API and N-API up to a concentration range of 55%-70% glycerol concentration and indicates that significant inhibition or reduced fluid absorption occurs beyond 35% glycerol concentrations.

Figure 2:
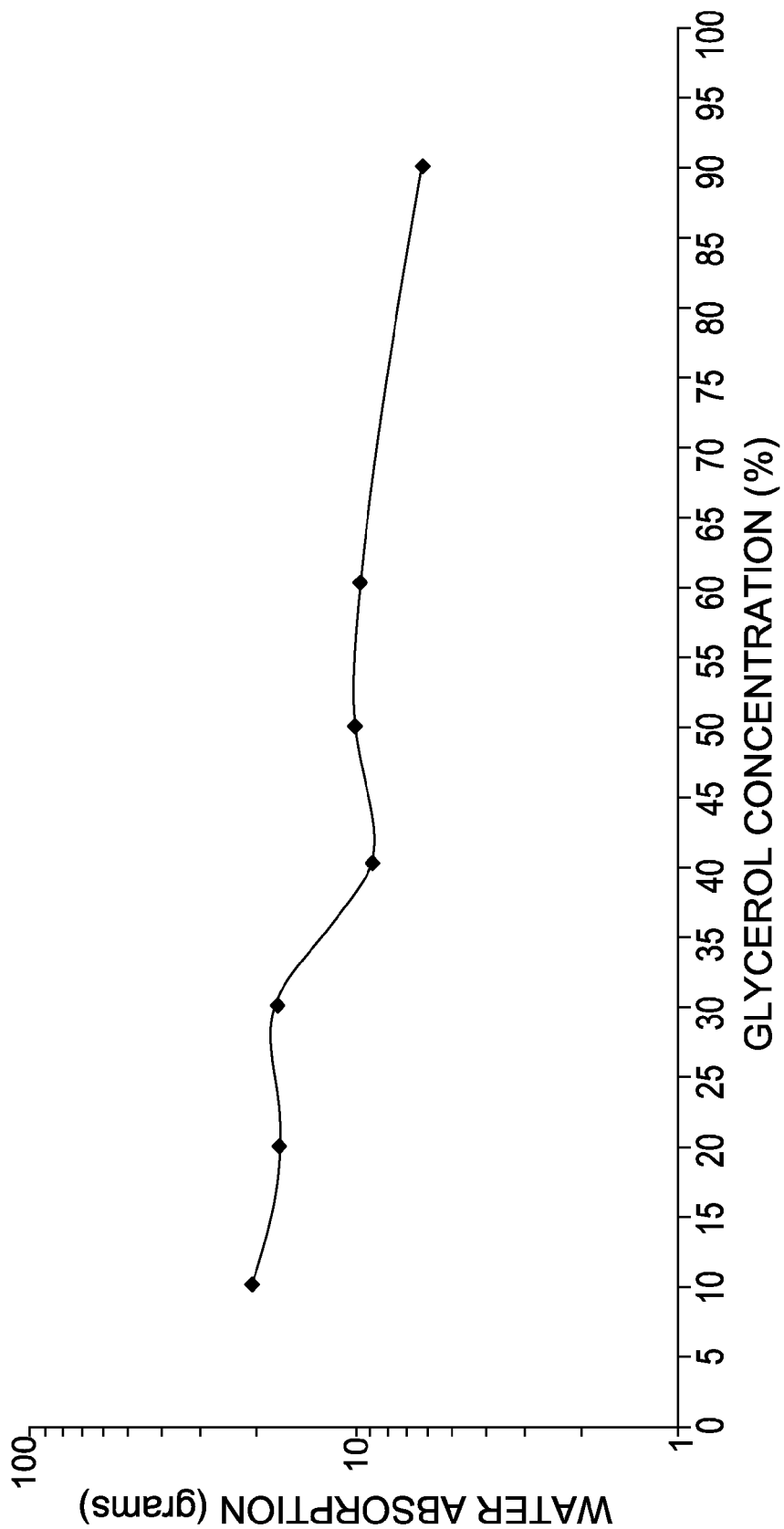
FIG. 2 is a graph showing the effect of PHPA within a glycerol emulsion on clay hydration.

FIG. 2 shows that the amount of water absorbed by the clay sample in the PHPA test declined as the glycerol concentration increased above 30%.

Figure 3:
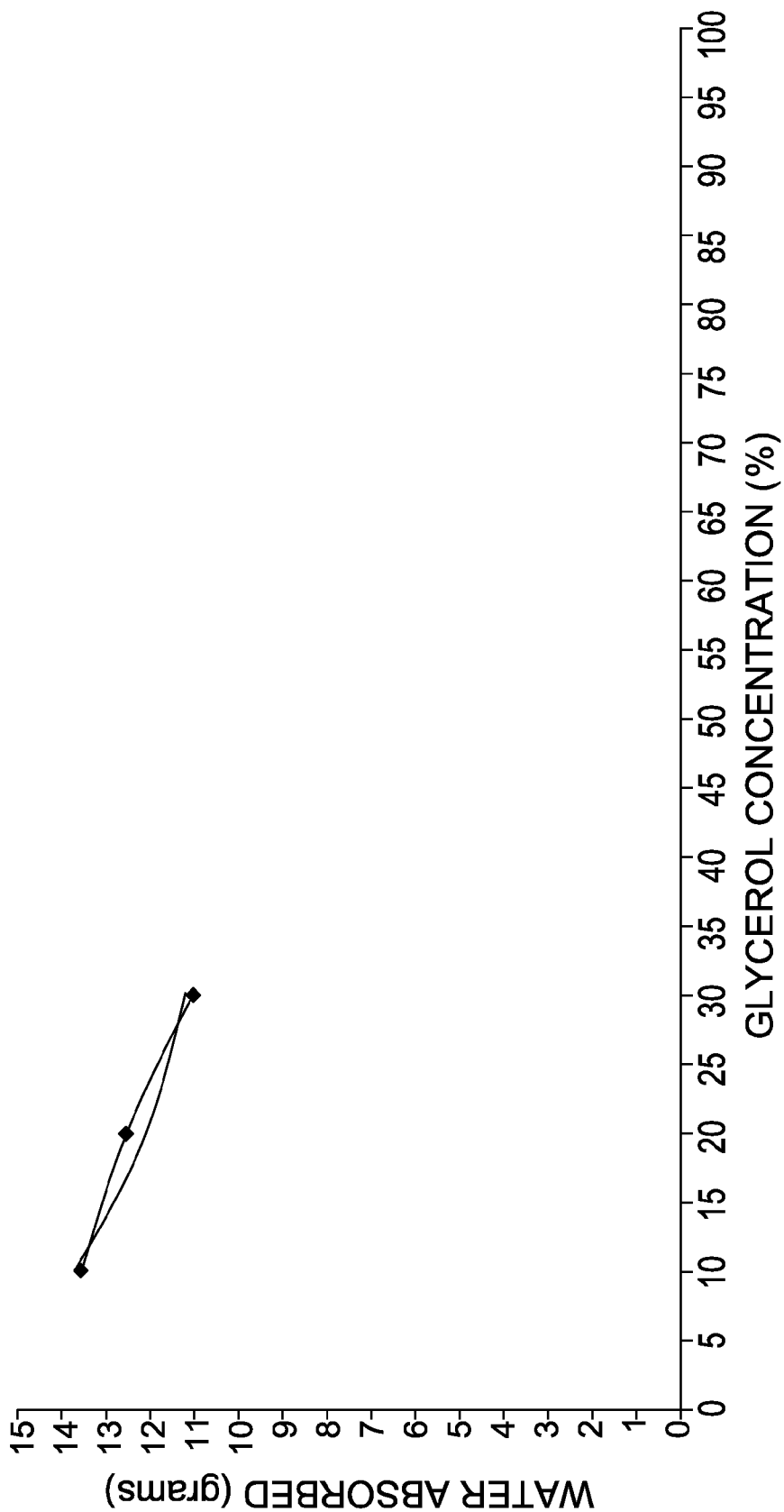
FIG. 3 is a graph showing the effect of potassium sulphate and PHPA within a glycerol emulsion on clay hydration.

FIG. 3 shows that the addition of $K_2SO_4$ to a PHPA glycerol fluid resulted in a decrease in water absorbed compared to solutions not containing a halide as shown in FIG. 2.

Figure 4:
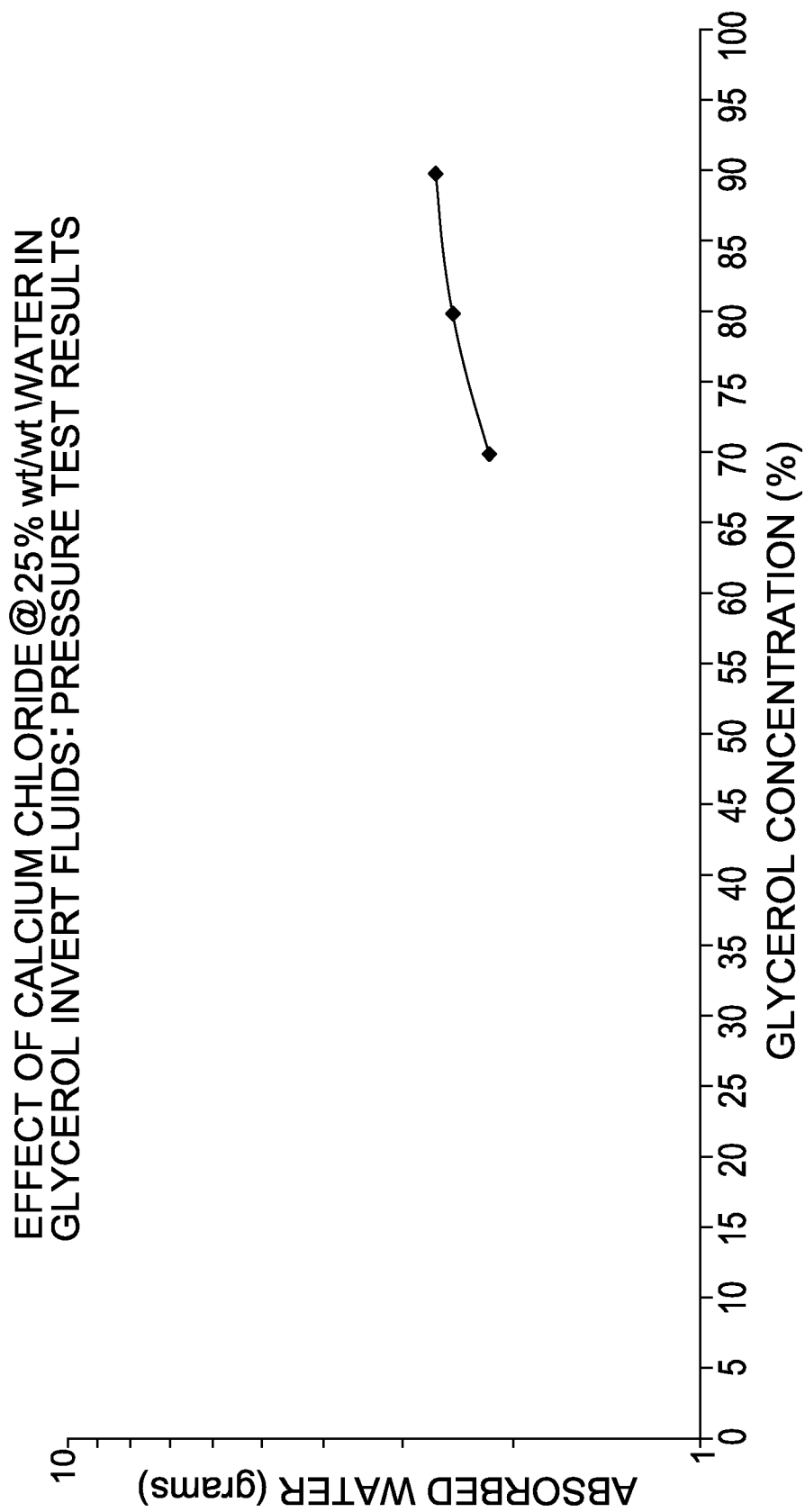
FIG. 4 is a graph showing the effect of calcium chloride within a glycerol emulsion on clay hydration.

FIG. 4 shows the effect of $CaCl_2$ on the absorption of water in the pressure test and shows that a high concentration of salt has a dramatic effect on the water absorption potential of the clay.

Figure 5:
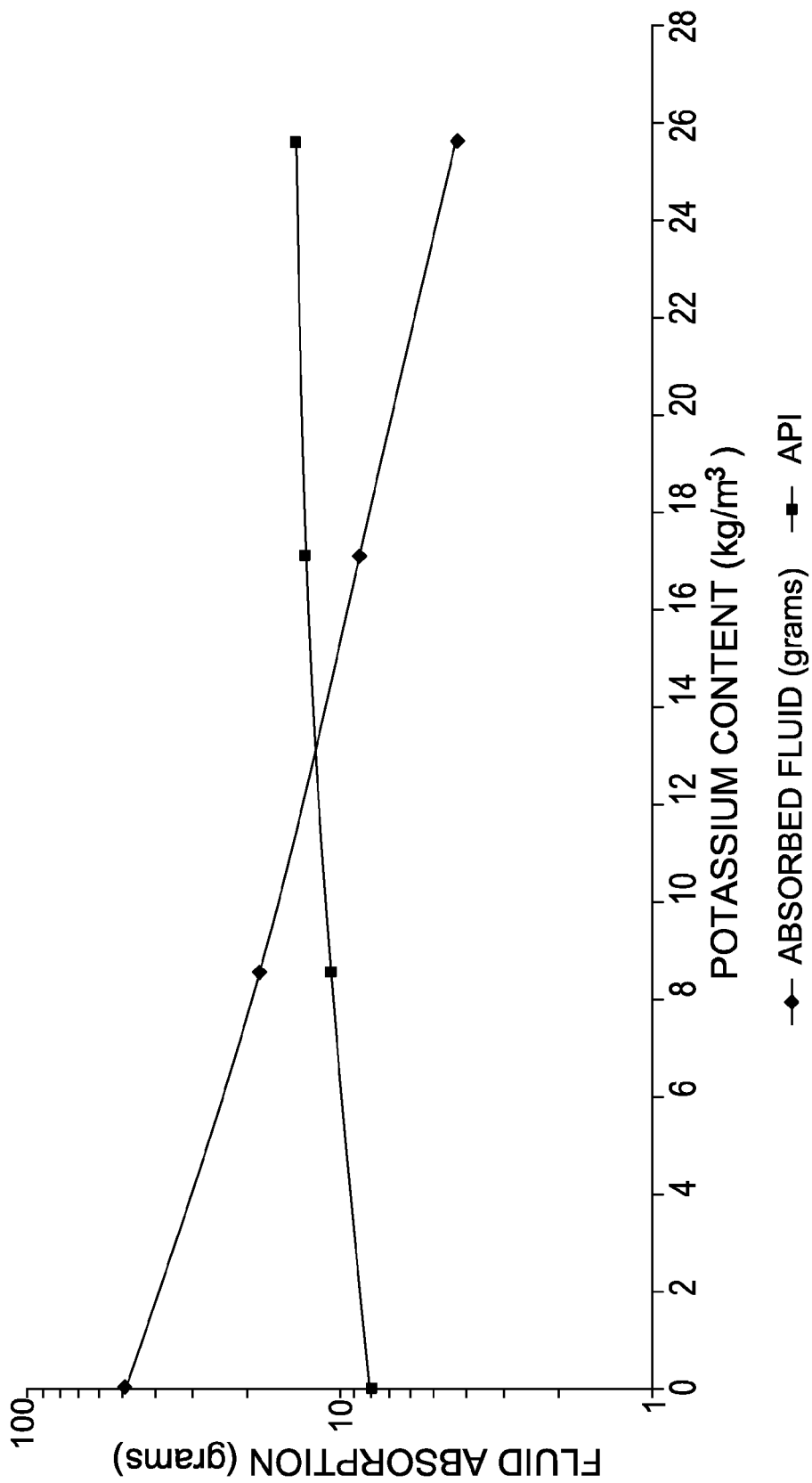
FIG. 5 is a graph showing the effect of potassium sulphate within a glycerol emulsion on clay hydration.

FIG. 5 shows baseline data generated using fresh water, with increasing $K_2SO_4$ concentration and the pressure test. Note the inverse of absorption to API values.

Figure 6:
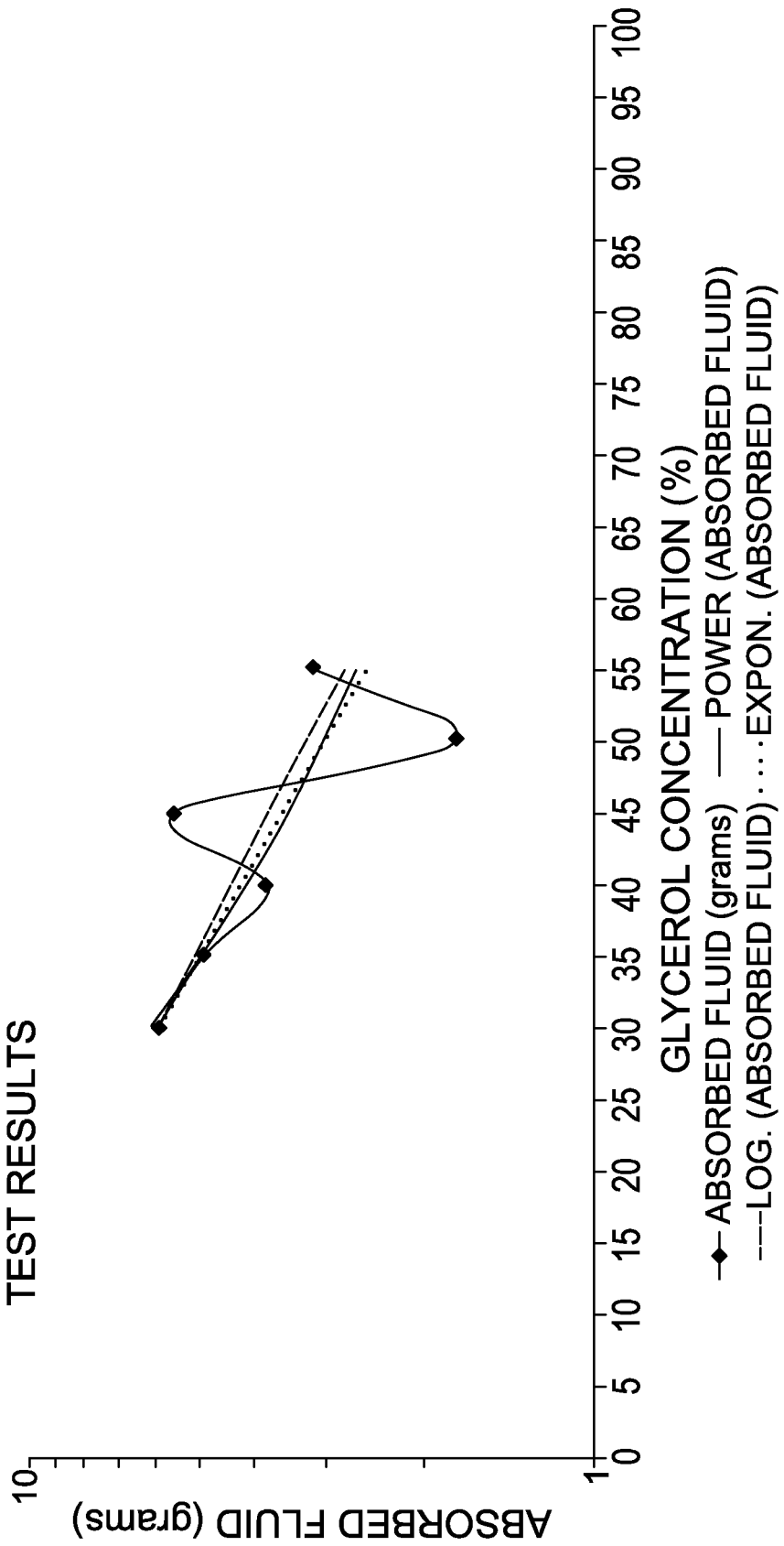
FIG. 6 is a graph showing the effect of a saturated potassium sulphate phase within glycerol emulsions on clay hydration.

FIG. 6 shows the effect of saturated $K_2SO_4$ fluids in glycerol and shows that $K_2SO_4$ produced very low values for water absorption.

Figure 7:
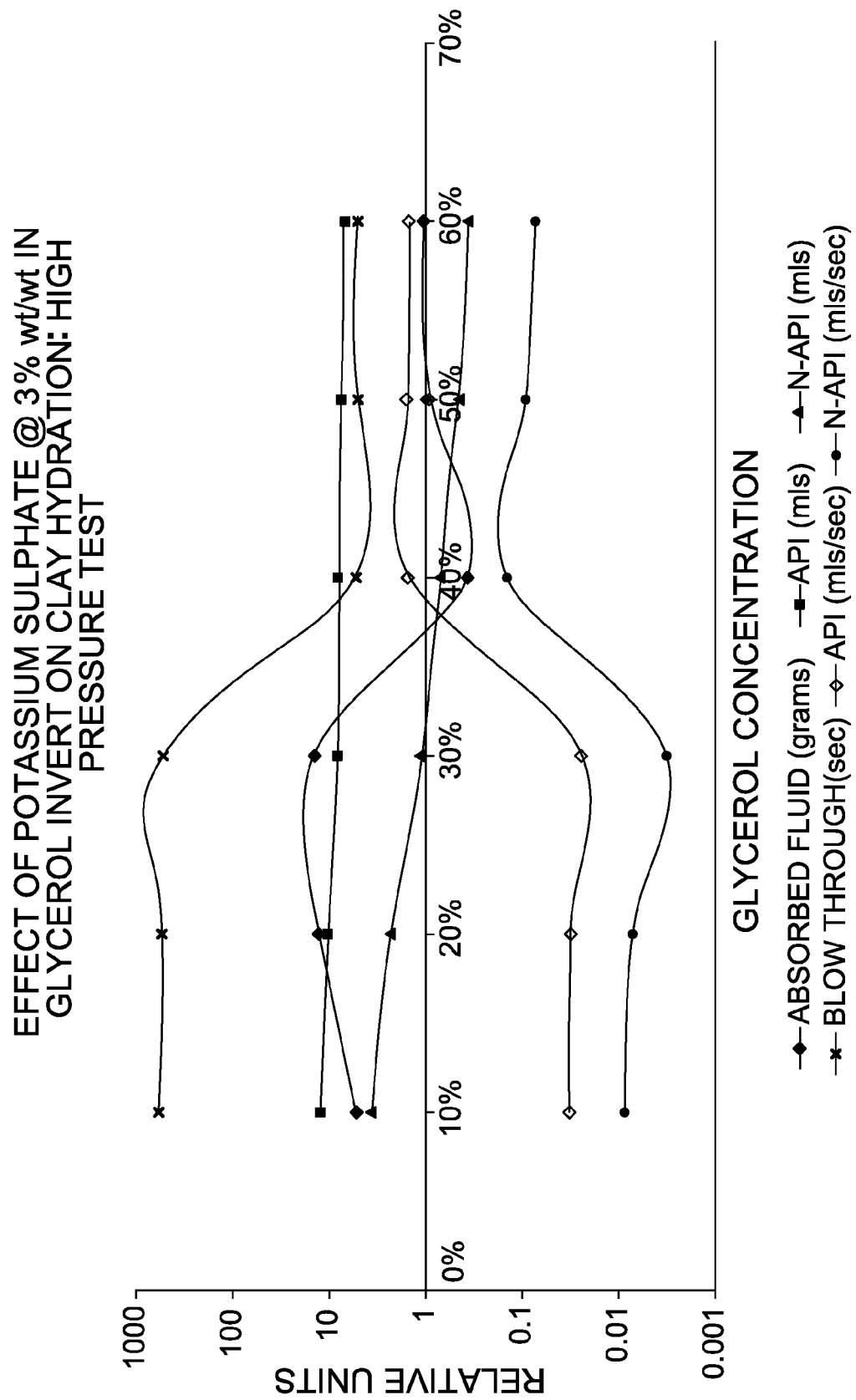
FIG. 7 is a graph showing the effect of potassium sulphate within glycerol emulsions on clay hydration as measured by API, N-API and blow-through tests; and, FIG. 8 is a graph showing the effect of calcium chloride within glycerol emulsions on clay hydration as measured by API, N-API and blow-through tests.

FIG. 7 shows the effectiveness of the addition of $K_2SO_4$ to the glycerol fluid in reducing the amount of fluid absorbed, especially with glycerol concentrations below 40%.

Figure 8:
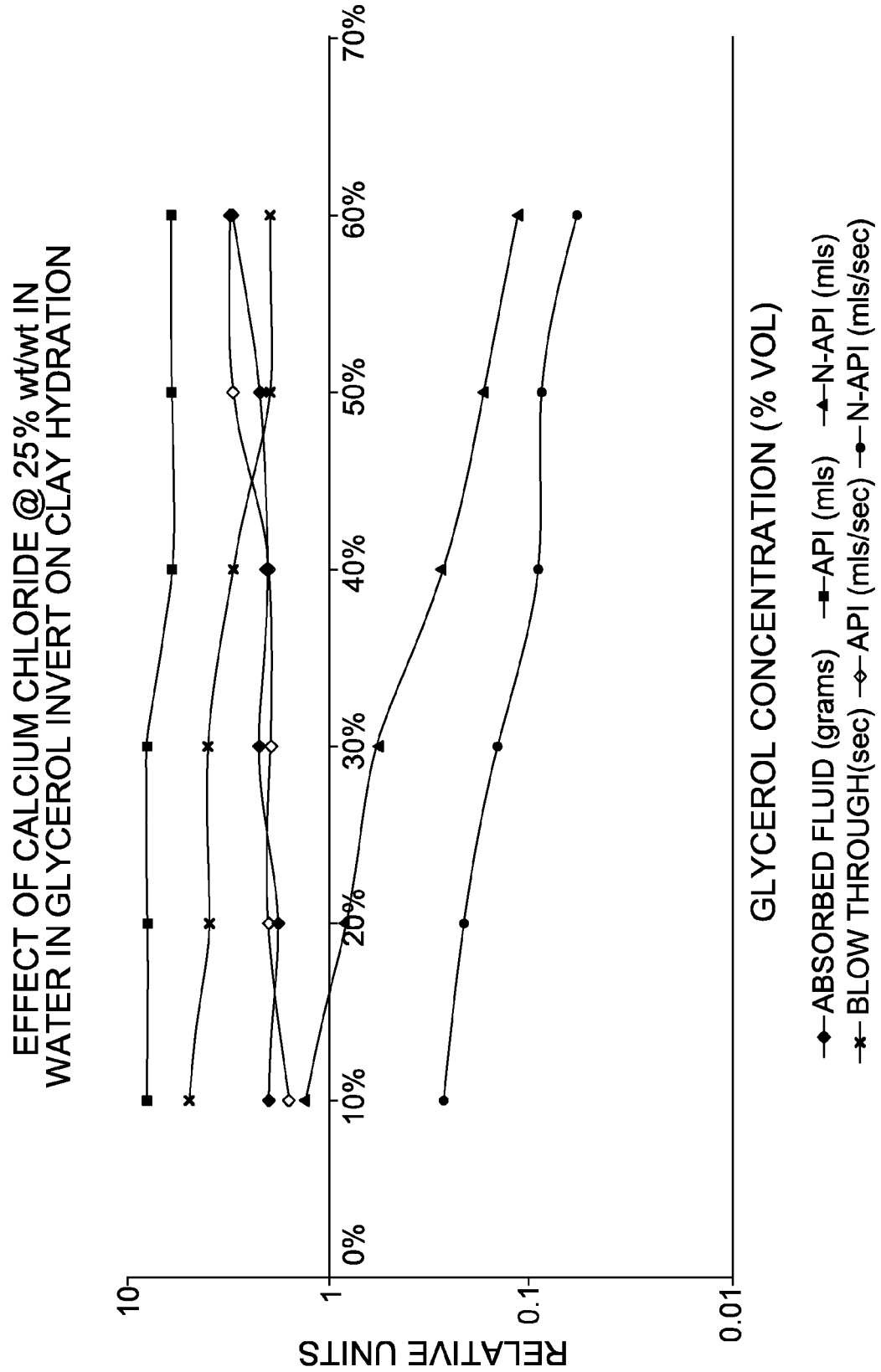

FIG. 8 shows that the amount of absorption of fluid does not significantly vary with glycerol content when the concentration of $CaCl_2$ is 25%. However, it should be noted that the $K_2SO_4$ fluid in Graph 7 demonstrated superior results at levels of glycerol >30%.

In addition, the results also showed that the hydration volumes of bentonite or sodium montmorillonite when exposed to a test solution over a period of 18 hrs. The results showed that significant inhibition of hydration occurs for glycerol/water ratios of 95/5 to 45/55 and that for a baseline fluid design without inhibition in the dispersed phase, ratios of >30% (preferably >45%) glycerol would be optimum.

Mondshine Test Results

Structural clay balls subjected to the Mondshine test using 3% by weight $K_2SO_4$ and 1 ppb PHPA showed good results as shown in Table 1.

TABLE 1

| Mondshine Test Results | | | | | | |
|---|---|---|---|---|---|---|
| Sample Glycerol/Water (v/v) | $K_2SO_4$ (w/w) | PHPA (parts/barrel) | Qualitative Structure (after Hot Rolling) | Initial Weight (g) | After Hot Rolling Weight (g) | Degree of Hydration (g) |
| 20/80 | 3% | 1 | Intact | 14.93 | 17.94 | +3.01 |
| 40/60 | 3% | 1 | Intact | 14.96 | 15.36 | +0.4 |
| 60/40 | 3% | 1 | Intact | 14.89 | 15.39 | +0.5 |
| Oil Based Invert Fluid (control) | | | Intact | 14.96 | 12.78 | −2.18 |

Table 1 shows that with the test solutions including 3% (w/w) of a Group 1 salt and PHPA were highly effective in inhibiting water uptake in a structured clay ball as compared to a control oil based invert drilling fluid. That is, in these tests, minimal water uptake was observed in a clay ball incubated and hot rolled in a glycerol/water drilling fluid for 18 hours thus indicating that the glycerol/water drilling fluids did not destroy a hydratable clay when subjected to significant mechanical stress.

As noted above, the foregoing described drilling solutions may be used in drilling a well in a manner as known to those skilled in the art. Variations in the formulations that are not expressly noted herein are possible within the scope of the invention as would be known to those skilled in the art. For example, variations in additives may be introduced so as to adjust a specific drilling fluid parameter based on specific downhole conditions.

The invention claimed is:

1. A method of drilling a well having a water-sensitive formation comprising the steps of:
    a) preparing a drilling solution comprising a 95:5 to 20:80 volume % glycerol:water solution including dissolved and partially hydrolysed-polyacrylonitrile (PH-PAN), the solution capable of stabilizing water-sensitive formations during drilling; and,
    b) drilling a well with the drilling solution prepared in step a).

2. A method as in claim 1 wherein the drilling solution includes a dissolved Group 1 metal salt.

3. A method as in claim 2 wherein the Group 1 metal of the Group 1 metal salt has a hydration radius equal to or less than that of potassium.

4. A method as in claim 2 wherein the Group 1 metal salt is 1% by weight.

5. A method as in claim 2 wherein the Group 1 metal salt is selected from potassium chloride, potassium acetate, potassium sulphate, potassium formate or a combination thereof.

6. A method as in claim 1 wherein the drilling fluid includes a dissolved metal halide.

7. A method as in claim 6 wherein the dissolved metal halide is calcium chloride.

8. A method as in claim 1 wherein the drilling fluid includes a dissolved and partially hydrolysed-polyacrylamide (PH-PA).

9. A method as in claim 8 wherein the dissolved and partially hydrolysed-polyacrylamide (PH-PA) is 1 part per barrel.

10. A method of drilling a well having a water-sensitive formation comprising the steps of:
   a) preparing a drilling solution comprising a 95:5 to 60:40 volume % glycerol:water solution including dissolved and partially hydrolysed-polyacrylonitrile (PH-PAN), the solution capable of stabilizing water-sensitive formations during drilling; and,
   b) drilling a well with the drilling solution prepared in step a).

11. A method as in claim 10 wherein the drilling solution includes a dissolved Group 1 metal salt.

12. A method as in claim 11 wherein the Group 1 metal of the Group 1 metal salt has a hydration radius equal to or less than that of potassium.

13. A method as in claim 11 wherein the Group 1 metal salt is 1% by weight.

14. A method as in claim 11 wherein the Group 1 metal salt is selected from potassium chloride, potassium acetate, potassium sulphate, potassium formate or a combination thereof.

15. A method as in claim 10 wherein the drilling fluid includes a dissolved metal halide.

16. A method as in claim 15 wherein the dissolved metal halide is calcium chloride.

17. A method as in claim 10 wherein the drilling fluid includes a dissolved and partially hydrolysed-polyacrylamide (PH-PA).

18. A method as in claim 17 wherein the dissolved and partially hydrolysed-polyacrylamide (PH-PA) is 1 part per barrel.

* * * * *